United States Patent

Diekhans et al.

[11] Patent Number: 5,305,648
[45] Date of Patent: Apr. 26, 1994

[54] V-BELT DRIVE

[75] Inventors: Norbert Diekhans, Gütersloh; Willi Behnke, Steinhagen, both of Fed. Rep. of Germany

[73] Assignee: Claas Ohg, Harsewinkel, Fed. Rep. of Germany

[21] Appl. No.: 889,327

[22] Filed: May 28, 1992

[30] Foreign Application Priority Data

May 29, 1991 [DE] Fed. Rep. of Germany ....... 4117530

[51] Int. Cl.$^5$ ............................................. G01L 3/02
[52] U.S. Cl. ............................ 73/862.191; 73/862.194
[58] Field of Search ................... 73/862.194, 862.08, 73/862.31, 862.192, 862.191, 862.193, 1 B, 1 C; 474/69, 70, 71

[56] References Cited

U.S. PATENT DOCUMENTS

| | | | |
|---|---|---|---|
| 1,107,234 | 8/1914 | Morscher | 73/862.194 |
| 1,123,135 | 12/1914 | Morscher | 73/862.194 |
| 1,168,925 | 1/1916 | Zanzig | 73/862.194 |
| 3,992,932 | 11/1976 | Venema | |
| 4,141,245 | 2/1979 | Brandsetter | 73/862.194 X |
| 4,269,600 | 5/1981 | Curran | 474/69 |
| 4,321,991 | 3/1982 | Teijido et al. | 474/70 |
| 4,576,041 | 3/1986 | Martin | 73/862.194 X |
| 4,743,223 | 5/1988 | Tokoro et al. | 474/69 |
| 4,909,086 | 3/1990 | Kaneko et al. | 73/862.194 |
| 5,019,017 | 5/1991 | Monch | 73/862.194 X |
| 5,156,572 | 10/1992 | Morishige | 474/70 |

FOREIGN PATENT DOCUMENTS

| | | |
|---|---|---|
| 2004704 | 8/1971 | Fed. Rep. of Germany . |
| 0158674 | 1/1983 | Fed. Rep. of Germany . |
| 3128495 | 3/1983 | Fed. Rep. of Germany . |
| 3204783 | 8/1983 | Fed. Rep. of Germany . |
| 61-26423 | 11/1986 | Japan .................... 73/862.391 |
| 0894397 | 12/1981 | U.S.S.R. . |
| 0005184 | of 1882 | United Kingdom . |

OTHER PUBLICATIONS

DE-Z: Peeken, H.; Fischer, F.: Vorspannungsmesseverfahren für Riemengetriebe und ihre Genauigktei. In: antriebstechnik 28, No. 9, 1989 S.76-86.

Lutz, Otto; Schulms, K.-D.: Scheibenspreizkräfte und Scheibenanspressevorrichtung in vertellbaren Keilscheiben-Umschlingungsgetrieben, In: VDI-Z: 108, No. 23, Aug. 1966, S.1128-1133.

Lutz, Otto; u.a.: Selbsthemmung im kraftschlüssigen Keilscheiben-Umschlingungsgetriebe, In: Konstruction, 12.Jg.,H.7, 1960, S.365-368.

Lutz, O.: Zur Theorie des Keilscheiben-Umschlingunsgetriebes. In: Konstruction, H.7,12.Jg., 1960, S.265-268.

Primary Examiner—Richard E. Chilcot, Jr.
Assistant Examiner—Elizabeth L. Dougherty
Attorney, Agent, or Firm—Browdy and Neimark

[57] ABSTRACT

The V-belt drive has a drive pulley (1) and a power take-off pulley (2) and an endless V-belt (3) rotating around both pulleys (1, 2). This V-belt drive is equipped with a torque measuring device in that an rpm sensor (4, 5) is assigned to both the drive pulley (1) and the power take-off pulley (2), which continuously detects the pulley rpm, the two rpm sensors (4, 5) are connected with an electronic control (8) which determines the gear ratio between the drive and the power take-off pulleys (1, 2) from the detected rpm, a calibration device (10) which associates a set gear ratio with a defined torque is connected with the electronic control (8), and the electronic control (8) is connected with an electronic evaluator (14).

5 Claims, 2 Drawing Sheets

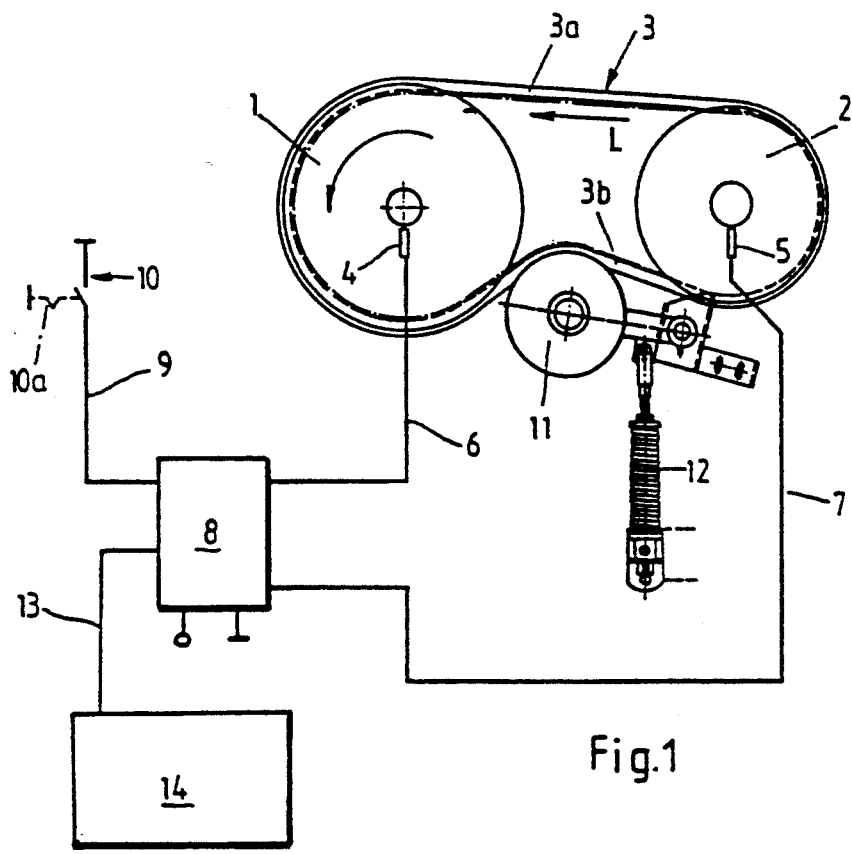
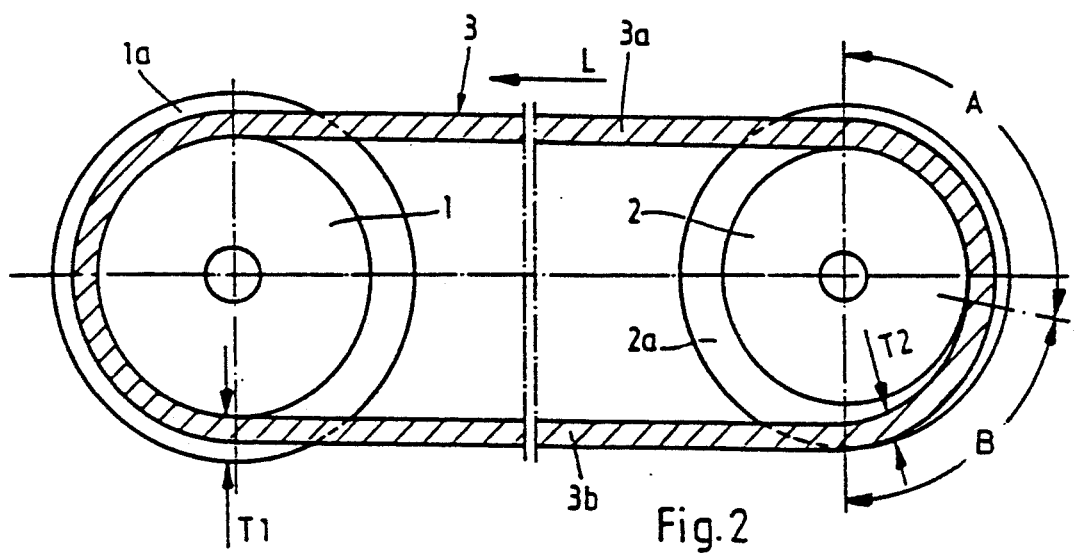

V-BELT DRIVE

SUMMARY OF THE INVENTION

The invention relates to the provision of a V-belt drive, where it is possible to determine the torque existing at different drive loads by simple means and in an optimal manner, as a function of the cooperating parts of the V-belt drive, i.e. drive pulley, power take-off pulley and V-belt, and to control and adjust it in this way.

The V-belt drive in accordance with the invention is equipped with a torque measuring device, which uses the depth of penetration of the V-belt in the V-belt grooves of the drive and power take-off pulleys, which heretofore often had been considered to be slippage and had not been taken into account, as well as the variable gear ratio caused thereby and compares this gear ratio, which continuously changes as a function of the load on the drive pulley, in an electronic device with a predetermined torque, evaluates the differences obtained in this manner for the changing torques, which results in the respectively actual torque.

By means of this it is possible in a simple and assured manner to control and adjust the torque; at the same time detect and immediately remedy developing troubles, overloads, wear and the like in connection with the various machines and devices to be powered, such as agricultural machinery, industrial machinery and the like.

BRIEF DESCRIPTION OF THE DRAWINGS

An exemplary embodiment of the invention will be described in detail below by means of the following drawings:

FIG. 1 a lateral view of a V-belt drive with the schematic arrangement of the torque measuring device, FIG. 2 a lateral view of the drive and power take-off pulleys and the V-belt of the drive with the V-belt indicated in hatched lines and inserted at different depths into the grooves of both pulleys, FIG. 3 a diagram of a torque measurement.

DETAILED DESCRIPTION OF THE PREFERRED EMBODIMENTS

Figure 3:
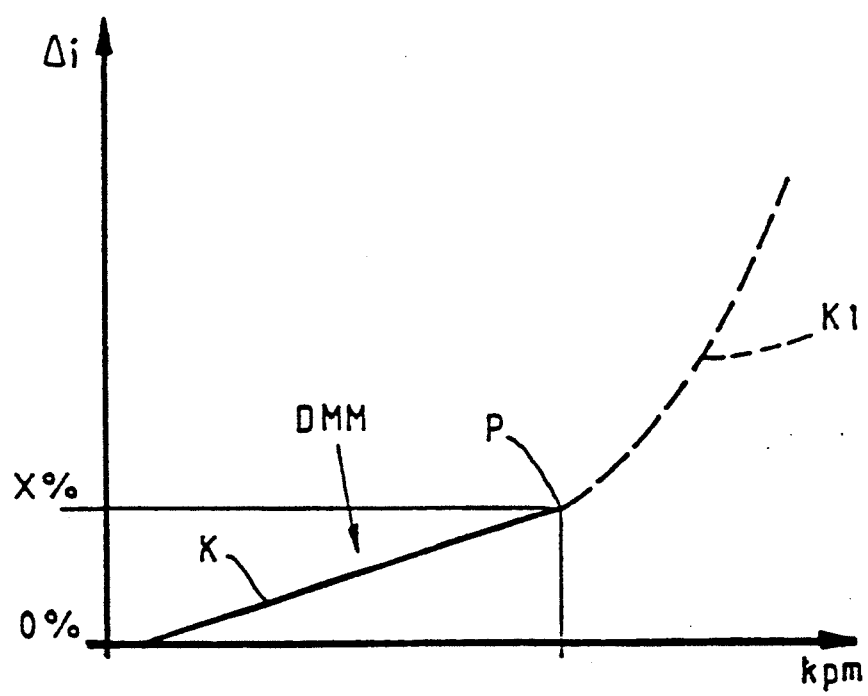

The V-belt drive has an engine-driven drive pulley (1) and a power take-off pulley (2), around which an endless V-belt (3) moves.

An rpm measuring device, in particular an rpm sensor (4, 5) is associated with both the drive pulley (1) and the power take-off pulley (2). Both sensors (4, 5) are connected via a control line (6, 7) each with an electronic control (8), which converts the rpm of the two pulleys (1, 2), transmitted via the sensors (4, 5), into a RPM or gear ratio.

The electronic control (8) with voltage supply is connected via a control line (9) with calibration device (10), which associates the known RPM or gear ratio with a known torque. The control device (8) is furthermore connected via a connecting line (13) with an electronic evaluator (14), such as a display, control device, or the like.

The two rpm sensors (4, 5), together with the control (electronics) (8) and calibration device (10), constitute an rpm measurement which is performed as a function of the greater or lesser depth to which the V-belt is pulled into the V-belt grooves (1a, 2a) of the two pulleys (1, 2) in the course of the rotation of the V-belt and which takes place as described below.

Because of the varying load on the drive pulley (1) in the running direction (L) of the belt (3) on the drive side of the V-belt drive, the rotating V-belt (3) is pulled to a greater or lesser degree into the groove (1a) of the drive pulley (1) than into that of the power take-off pulley (2).

This is clearly visible in FIG. 2, because over half its circumference the driving pulley (1) pulls the V-belt (3) deeper into its groove (1a) in comparison to the power take-off pulley (2), where the V-belt (3) is only deeply pulled into the groove (2a) over a portion of the pulley circumference (partial area "A") on the loaded belt side (3a) - direction of rotation (L) The V-belt is pulled into the remaining portion of the pulley circumference to a lesser depth of the groove (2a), on the slack side of the belt (B). Thus, at the drive pulley (1) the V-belt (3) which is at a higher belt tension enters more deeply into the pulley groove (1a) than at the power take-off pulley (2).

Differing rotational diameters of the belt (3) are caused by these differing penetration depths of the V-belt (3) and, because of that, different rpm of the two pulleys (1, 2).

The RPM or gear ratio of the two pulleys (1, 2) is changed by means of this action.

To compensate for this action, the RPM or gear ratio is changed by means of the rpm sensors (4, 5), depending on the load on the drive pulley (1) and the penetration depth (T1, T2) into both pulleys (1, 2) of the V-belt (3).

The rpm of both pulleys (1, 2) is continuously detected by means of the rpm sensors (4, 5), and these numbers are entered into the electronic device (8), which forms a RPM gear ratio therefrom.

In the no-load condition or with a known load of the V-belt drive a calibration is performed in the calibration device (10) by assigning the RPM or gear ratio to a set torque.

A change of the gear ratio in respect to the set torque results in a torque association in a table or equation entered into the electronic device (8), and the difference calculated therefrom is a measurement for the actual and therefore measured torque.

Calibration in the device (8) can take place automatically, for example when the rpm of the V-belt drive are of a set value; it is also possible to perform the calibration by means of a switch (10a) in the calibration device (10) when a defined load state of the machine, device, installation or the like driven by the V-belt has been reached.

With a variator drive with adjustable gearing the electronic device (8) is additionally interrogated to determine whether the change in gear ratio is intentional, so that a torque measurement can then be performed, or whether a fault is being reported.

In FIG. 1 a tensioning roller (11) engages the slack side (3b) of the V-belt (3), which is under the influence of a tensioning force device (12), such as a pressure spring, pressure medium cylinder, or the like.

FIG. 1 furthermore shows the penetration depth of is the V-belt (3) at low load in solid lines and in dash-dotted lines at load.

This torque measurement is not only suitable for use with one V-belt (3), but can also be employed with a plurality of V-belts (3) rotating next to each other around drive pulleys (1) of a common drive shaft and can also be provided in connection with compound V-belts.

FIG. 3 shows a diagram of a torque measurement.

The change of the gear ratio (delta i) can be read off from the ordinate and the drive torque (kpm) from the abscissa, and the gear change from 0% to X% corresponds to the working range (DMM) set and calibrated for the torque measurement.

With normal (uniform) slippage, the torque measurement from 0% to X% extends along a rising linear or slightly bent curve (K) as far as point (P). With superproportional slippage the curve (K1) rises more steeply and thus leaves the working range (DMM), and this excessive slippage is reported and the drive torque of the V-belt drive is adjusted.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A v-belt drive comprising:

a drive pulley and a power take-off pulley;

each said pulley having a v-groove with a constant cross-section;

an endless v-belt rotating around said drive pulley and said power take-off pulley guided in each said v-groove;

said v-belt penetrating into said v-groove of said driven pulley to a depth dependent on a current torque load condition;

a first RPM sensor engaged to said drive pulley to measure RPM at a current torque load condition;

a second RPM sensor engaged to said power take-off pulley to measure RMP at a current torque load condition;

electronic unit means engaged to and receiving signals from said first RPM sensor and said second RPM sensor for calculating a current RPM ratio of said drive pulley and said power take-off pulley;

torque measurement means included in said electronic unit means for comparing said current RPM ratio to an assigned calibrated RPM ratio corresponding to a torque produced within a working range of said drive pulley and said power take-off pulley to provide a torque reading representing a different between said current RPM ratio and said assigned calibrated RPM ration, wherein, a load on said drive pulley and said power take-off pulley can be adjusted if a difference between said current RPM ratio and said assigned calibrated exceeds, said assigned calibrated RPM ratio.

2. A V-belt drive according to claim 1 further comprising:

calibration means connected to said electronic unit means for establishing said assigned calibration RPM ratio for use in said electronic unit means.

3. The V-belt drive according to claim 1, further comprising:

electronic evaluator means connected to said electronic unit means for displaying a difference between said current RPM ratio and said assigned calibrated RPM ratio.

4. The V-belt drive according to claim 2, wherein a no-load condition is used to establish said assigned calibrated RPM ratio.

5. The V-belt drive according to claim 2, wherein a set known load condition is used to establish said assigned calibrated RPM ratio.

* * * * *